United States Patent
Zhang et al.

(10) Patent No.: US 11,132,792 B2
(45) Date of Patent: Sep. 28, 2021

(54) CROSS DOMAIN MEDICAL IMAGE SEGMENTATION

(71) Applicant: Siemens Healthcare GmbH, Erlangen (DE)

(72) Inventors: Yue Zhang, Long Island City, NY (US); Shun Miao, Bethesda, MD (US); Rui Liao, Princeton Junction, NJ (US); Tommaso Mansi, Plainsboro, NJ (US); Zengming Shen, Champaign, IL (US)

(73) Assignee: Siemens Healthcare GmbH, Erlangen (DE)

( * ) Notice: Subject to any disclaimer, the term of this patent is extended or adjusted under 35 U.S.C. 154(b) by 195 days.

(21) Appl. No.: 16/271,130

(22) Filed: Feb. 8, 2019

(65) Prior Publication Data
US 2019/0259153 A1 Aug. 22, 2019

Related U.S. Application Data

(60) Provisional application No. 62/633,801, filed on Feb. 22, 2018.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4609* (2013.01); *G06T 7/11* (2017.01);
(Continued)

(58) Field of Classification Search
CPC . G06T 7/0012; G06T 7/11; G06T 7/12; G06T 2207/20112; G06T 2207/10081;
(Continued)

(56) References Cited

U.S. PATENT DOCUMENTS

| | | | |
|---|---|---|---|
| 2016/0133037 A1* | 5/2016 | Vemulapalli | G06T 11/60 382/128 |
| 2016/0210749 A1* | 7/2016 | Nguyen | G06N 3/0454 |

(Continued)

OTHER PUBLICATIONS

Chartsias, A et al., "Adversarial Image Synthesis for Unpaired Multi-Modal Cardiac Data", International Workshop on Simulation and Synthesis in medical imaging, Spriner, Cham, 2017.*

(Continued)

*Primary Examiner* — Samir A Ahmed

(57) ABSTRACT

Systems and method are described for medical image segmentation. A medical image of a patient in a first domain is received. The medical image comprises one or more anatomical structures. A synthesized image in a second domain is generated from the medical image of the patient in the first domain using a generator of a task driven generative adversarial network. The one or more anatomical structures are segmented from the synthesized image in the second domain using a dense image-to-image network of the task driven generative adversarial network. Results of the segmenting of the one or more anatomical structures from the synthesized image in the second domain represent a segmentation of the one or more anatomical structures in the medical image of the patient in the first domain.

19 Claims, 12 Drawing Sheets

(51) Int. Cl.
 *G06T 7/11* (2017.01)
 *G06T 7/12* (2017.01)
 *G06K 9/46* (2006.01)

(52) U.S. Cl.
 CPC .............. *G06T 7/12* (2017.01); *G06K 9/0014* (2013.01); *G06T 2207/10081* (2013.01); *G06T 2207/20112* (2013.01); *G06T 2207/30004* (2013.01)

(58) Field of Classification Search
 CPC . G06T 2207/30004; G06T 2207/20084; G06T 2207/20081; G06K 9/4609; G06K 9/0014; G06K 2209/05; G06K 9/6262; G06K 9/6273; G06N 7/005; G06N 3/08; G06N 3/0454
 See application file for complete search history.

(56) References Cited

U.S. PATENT DOCUMENTS

2016/0314600 A1* 10/2016 Nguyen ................ G06T 7/0012
2017/0200067 A1* 7/2017 Zhou ..................... G06K 9/4609
2017/0337682 A1* 11/2017 Liao ......................... G06T 7/30

OTHER PUBLICATIONS

Yang, D et al., "Automatic Liver Segmentation Using Adversarial Image-to-Image Network", arXiv: 1707.08037v 1, Jul. 25, 2017.*
Zhang, Y et al. "Deep Adversarial Networks for Biomedical Image Segmentation Utilizing Unannotated Images" International Conference on Medical Image Computing and Computer-Assisted Intervention, Springer, 2017.*
Wolterink, J et al., "Deep MR to CT Synthesis using Unpaired Data" arXiv:1708.01155v1 [cs.CV] Aug. 3, 2017.*
Nie, D et al. "Medical Image Synthesis with Contest Aware Generative Adversarial Networks" arXiv: 1612.05362v 1, Dec. 16, 2016.*
Neff, T et al. "Generative Adversarial Network based Synthesis for Supervised Medical Image Segmentation", Proc. OAGM and ARW joint Workshop, 2017.*
Nie, D et al., "Medical Image Synthesis with Context-Aware Generative Adversarial Networks", Med Image Comput Comput Assist Interv. Sep. 2017; 10435: 417-425.*
Guibas, J et al., "Synthetic Medical Images from Dual Generative Adversarial Networks", arXiv:1709.01872v3 [cs.CV] Jan. 8, 2018.*
Dai, W et al., "SCAN: Structure Correcting Adversarial Network for Organ Segmentation in Chest X-rays", arXiv:1703.08770v2 [cs.CV] Apr. 10, 2017.*
Taigman, Y et al., "Unsupervised Cross-Domain Image Generation", arXiv:1611.02200v1 [cs.CV] Nov. 7, 2016.*
Zhu et al., "Dynamic Layer Separation for Coronary DSA and Enhancement in Fluoroscopic Sequences", MICCAI, 2009, 8 pgs.
Ronneberger et al.,"U-Net: Convolutional Networks for Biomedical Image Segmentation", MICCAI, May 2015, 8 pgs.
Albarqouni et al., "X-ray In-Depth Decomposition: Revealing The Latent Structures", MICCAI Mar. 2017, 8 pgs.
Bousmalis et al., "Domain Separation Networks", 30th Conference on Neural Information Processing Systems, Barcelona Spain, 2016, 9 pgs.
Tzeng Ei Al., "Adversarial Discriminative Domain Adaption", Computer Vision Foundation, 2017, pp. 7167-7176.
Bousmalis et al., "Unsupervised Pixel-Level Domain Adaption with Generative Adversarial Networks", Computer Vision Foundation, 2017, pp. 3722-3731.
Zhu et al., "Unpaired Image-to-lmage Translation using Cycle-Consistent Adversarial Networks", Computer Vision Foundation, 2017, pp. 2223-2232.
Huang et al., "Densely Connected Convolutional Networks", Computer Vision Foundation, 2017, pp. 4700-4708.
Jegou et al., "The One Hundred Layers Tiramisu: Fully Convolutional DenseNets for Semantic Segmentation", Computer Vision Center, Barcelona, Spain, Oct. 2017, 9 pgs.
He et al., "Deep Residual Learning for Image Recognition", IEEE Xplore, pp. 770-778.
Mirza et al., "Conditional Generative Adversarial Nets", Nov. 2, 2014, 7 pgs.
Vese et al., "A Multiphase Level Set Framework for Image Segmentation Using the Mumford and Shah Model", International Journal of Computer Vision, 2002, pp. 271-293.
Boykov et al., "Graph Cuts and Efficient N-D Image Segmentation", International Journal of Computer Vision, 2006, Springer Science and Business Media, LLC, The Netherlands, pp. 109-131.
Long et al., "Fully Convolutional Networks for Semantic Segmentation", IEEE Conference, 2015, pp. 3431-3440.
Zhang et al., "Task Driven Generative Modeling for Unsupervised Domain Adaptation: Application to X-ray Image Segmentation", Medical Image Computing and Computer Assisted Intervention, 2018, 9 pgs.

* cited by examiner

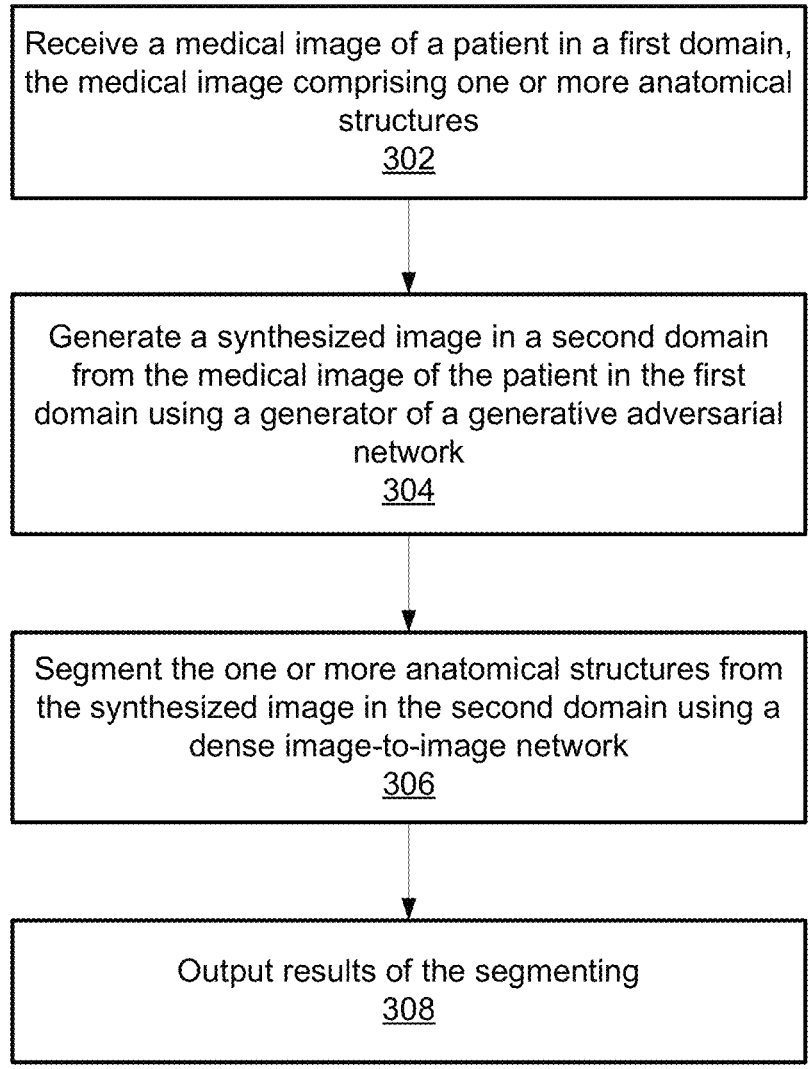

| Objects | Vanilla | CGAN | TD-GAN-A | TD-GAN-S | TD-GAN | Supervised |
|---|---|---|---|---|---|---|
| Bone | 0.401 | 0.808 | 0.800 | 0.831 | 0.835 | 0.871 |
| Heart | 0.233 | 0.816 | 0.846 | 0.860 | 0.870 | 0.880 |
| Liver | 0.285 | 0.781 | 0.797 | 0.804 | 0.817 | 0.841 |
| Lung | 0.312 | 0.825 | 0.853 | 0.879 | 0.894 | 0.939 |
| mean | 0.308 | 0.808 | 0.824 | 0.844 | 0.854 | 0.883 |

CROSS DOMAIN MEDICAL IMAGE SEGMENTATION

CROSS-REFERENCE TO RELATED APPLICATIONS

This application claims the benefit of U.S. Provisional Application No. 62/633,801, filed Feb. 22, 2018, the disclosure of which is incorporated herein by reference in its entirety.

TECHNICAL FIELD

The present invention relates generally to cross domain medical image segmentation, and more particularly to cross domain medical image segmentation using task drive generative adversarial networks.

BACKGROUND

Analysis of x-ray medical images is important for many clinical applications. For example, automatic segmentation of anatomical objects in x-ray medical images provides a semantic understanding of those anatomical objects for pathological diagnosis, treatment evaluation, and surgical planning. However, automatic segmentation of x-ray medical images remains a challenging task due primarily to the projective nature of the x-ray medical images, which causes large overlaps of anatomies, fuzzy object boundaries, and complex texture patterns in the x-ray medical images.

Conventional approaches for the automatic segmentation of anatomical objects in x-ray medical images utilize deep convolutional networks. Such deep convolutional networks are specific to the domain from which they are trained and require a large amount of annotated training data. However, due to the heterogeneous nature of x-ray medical images, accurate annotating of those x-ray medical images is extremely difficult and time consuming.

BRIEF SUMMARY OF THE INVENTION

In accordance with one or more embodiments, systems and methods for medical image segmentation are provided. A medical image (e.g., an x-ray medical image) of a patient in a first domain is received. The medical image comprises one or more anatomical structures. A synthesized image (e.g., a digitally reconstructed radiograph) in a second domain is generated from the medical image of the patient in the first domain using a generator of a task driven generative adversarial network. The one or more anatomical structures are segmented from the synthesized image in the second domain using a dense image-to-image network of the task driven generative adversarial network. Results of the segmenting of the one or more anatomical structures from the synthesized image in the second domain represent a segmentation of the one or more anatomical structures in the medical image of the patient in the first domain.

In accordance with one or more embodiments, the generator of the task driven generative adversarial network is trained based on a comparison between 1) a synthesized training image in the second domain and its predicted segmentation labels and 2) a real training image in the second domain and its annotated segmentation labels. The synthesized training image in the second domain is generated by the generator from a real training image in the first domain. The predicted segmentation labels of the reconstructed training image in the second domain may be predicted using the dense image-to-image network. In some embodiments, the task driven generative adversarial network may be modified by further training the task driven generative adversarial network based on a comparison between 1) a synthesized training image in the first domain and its predicted segmentation labels and 2) a real training image in the first domain and its annotated segmentation labels. The synthesized training image in the first domain is generated by another generator of the task driven generative adversarial network from a real training image in the second domain.

In another embodiment, the generator of the task driven generative adversarial network is trained based on predicted segmentation labels of a reconstructed training image in the second domain and annotated segmentation labels of a real training image in the second domain. The reconstructed training image in the second domain is generated from a synthesized training image in the first domain, which is generated from the real training image in the second domain. The predicted segmentation labels of the reconstructed training image in the second domain may be predicted using the dense image-to-image network.

In accordance with one or more embodiments, the task driven generative adversarial network is trained using unlabeled training images in the first domain and labeled training images in the second domain. In one embodiment, the dense image-to-image network is trained to segment the one or more anatomical structures from the synthesized image in the second domain using labeled training images in the second domain, without training images in the first domain These and other advantages of the invention will be apparent to those of ordinary skill in the art by reference to the following detailed description and the accompanying drawings.

BRIEF DESCRIPTION OF THE DRAWINGS

FIG. 3 shows a method for segmenting one or more anatomical structures from a medical image, in accordance with one or more embodiments;

FIG. 8 shows a table comparing segmentation results, in accordance with one or more embodiments.

DETAILED DESCRIPTION

The present invention generally relates to methods and systems for cross domain medical image segmentation. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed by a computer system using data stored within the computer system.

It should be understood that while the embodiments discussed herein may be discussed with respect to segmenting one or more anatomical structures from a medical image of a patient, the present invention is not so limited. Embodiments of the present invention may be applied for the analysis of any structure of interest from any type of image.

Figure 1:
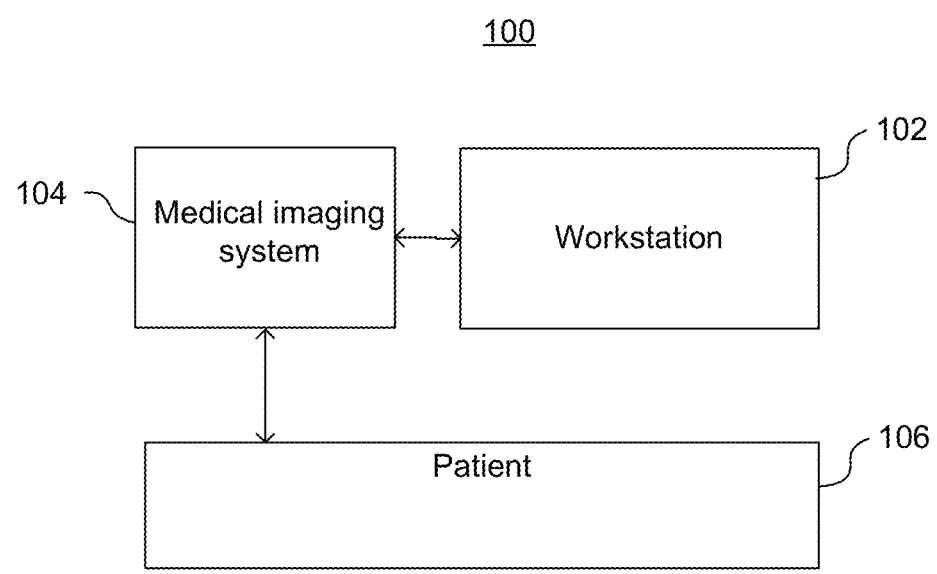
FIG. 1 shows an illustrative system for automatically segmenting anatomical structures from medical images, in accordance with one or more embodiments.

FIG. 1 shows a system 100 configured to automatically segment anatomical structures from medical images, in accordance with one or more embodiments. System 100 includes workstation 102, which may be used for assisting a clinician (e.g., a doctor, a medical professional, or any other user) in performing a medical evaluation or procedure on a patient 106 (or any other subject). Workstation 102 may be implemented using any suitable computing device, such as, e.g., computer 902 of FIG. 9.

Workstation 102 may assist the clinician in performing a medical evaluation of patient 106 based on medical images of patient 106 received from one or more medical imaging systems 104. In one advantageous embodiment, the medical images received from medical imaging system 104 is an x-ray medical image. However, it should be understood that the medical images received from medical imaging system 104 may be of any suitable domain.

As used herein, a particular "domain" associated with a medical image refers to the modality of the medical image, such as, e.g., a two-dimensional (2D) or three-dimensional (3D) computed tomography (CT), x-ray, magnetic resonance imaging (MRI), ultrasound (US), single-photon emission computed tomography (SPECT), positron emission tomography (PET), etc., as well as the protocol used for obtaining the medical image in that modality, such as, e.g., MR images with different protocols (e.g., T1 and T2), contrast CT images and non-contrast CT images, CT images captured with low kV and CT images captured with high kV, or low and high resolution medical images. That is, a "first domain" and "second domain" may be completely different medical imaging modalities or different image protocols within the same overall imaging modality.

Workstation 102 may analyze the medical images received from medical imaging system 104 to assist the clinician in performing the medical evaluation of patient 106. For example, anatomical structures in an x-ray medical image of patient 106 may be segmented for, e.g., pathological diagnosis, treatment evaluation, and surgical planning.

Conventionally, x-ray medical images are automatically segmented using deep convolution networks. Such conventional deep convolution networks are specific to the domain from which they are trained and require a large amount of annotated training data. However, annotated x-ray training images are extremely difficult and time consuming to obtain due to the large overlaps of anatomies, fuzzy boundaries, and complex texture patterns in the x-ray medical images.

Embodiments of the present invention provide for cross domain segmentation of medical images. In accordance with an advantageous embodiment, a task driven generative adversarial network (TD-GAN) is provided. The TD-GAN comprises a modified Cycle-GAN for translating the x-ray medical image to a synthesized digitally reconstructed radiograph (DRR) image, and a trained dense image-to-image (DI2I) network for segmenting the synthesized DRR image. The segmentation results of the synthesized DRR image represents the segmentation of the x-ray medical image. Advantageously, the TD-GAN provides segmentation results of the x-ray medical image without requiring annotated x-ray medical training images.

Figure 2:
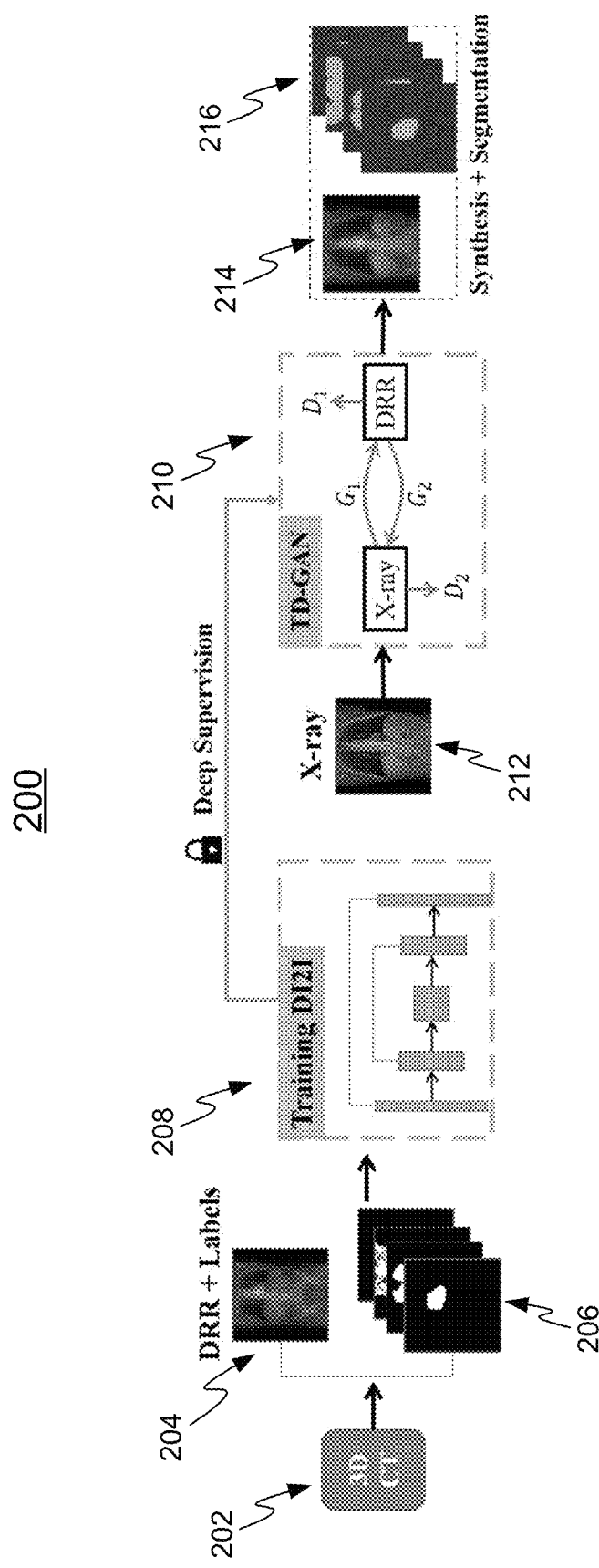
FIG. 2 shows a high-level framework for automatically segmenting anatomical structures from an x-ray medical image, in accordance with one or more embodiments.

FIG. 2 shows a high-level framework 200 for automatically segmenting anatomical structures from an x-ray medical image, in accordance with one or more embodiments. Framework 200 includes TD-GAN 210 for synthesis and segmentation of x-ray medical image 212 to provide synthesized DRR image 214 and segmentation results 216.

At a training stage 208, DI2I network is trained for multi-organ (e.g., lung, heart, liver, bone) segmentation using DRR images 204 annotated with pixel level labels 206, which were generated from segmented pre-operative 3D CT training images 202. TD-GAN 210 is trained using the pre-trained DI2I network with unannotated x-ray training images and annotated DRR training images (not shown) for pixel-to-pixel translation between DRR images and x-ray images.

During an online phase, trained TD-GAN 210 receives x-ray image 212 for multi-organ segmentation. The trained TD-GAN 210 translates x-ray medical image 212 to a synthesized DRR image 214 and segments the synthesized DRR image 214 to provide segmentation results 216 (e.g., segmentation masks). Advantageously, TD-GAN 210 provides segmentation results 216 of x-ray medical image 212 without using annotated x-ray training images.

FIG. 3 shows a method 300 for segmenting one or more anatomical structures from a medical image, in accordance with one or more embodiments. In one embodiment, method 300 is performed by workstation 102 of FIG. 1. Method 300 is performed during an online or testing stage using a trained TD-GAN. The trained TD-GAN is trained during a prior training stage. The trained TD-GAN comprises a trained DI2I network and a trained modified Cycle-GAN. Training the TD-GAN is discussed in more detail below with respect to FIGS. 4A-4F. It should be understood that the steps of method 300 can be repeated for each newly received medical image using the trained TD-GAN.

At step 302, a medical image of a patient in a first domain is received. The medical image includes one or more anatomical structures, such as, e.g., lung, heart, liver, bones, etc. The medical image of the patient in the first domain may be of any suitable domain, however in an advantageous embodiment, the medical image of the patient in the first domain is an x-ray medical image of the patient.

The medical image may be received directly from an image acquisition device used to acquire the input medical image, such as, e.g., medical imaging system 104 of FIG. 1. Alternatively, the medical image may be received by loading a previously acquired medical image from a storage or memory of a computer system or receiving a medical image that has been transmitted from a remote computer system.

At step 304, a synthesized (also referred to as "fake") image in a second domain is generated from the medical image of the patient in the first domain using a generator of the TD-GAN. The TD-GAN is trained during a prior training stage. The synthesized image in the second domain may be of any suitable domain different that the first domain, however in an advantageous embodiment, the synthesized image in the second domain is a DRR image.

In one embodiment, the TD-GAN is trained with conditional adversarial training based on a comparison between: 1) a synthesized training image in the second domain (generated by the generator from a real training image in the first domain) and its predicted segmentation labels and 2) a real training image in the second domain and its annotated segmentation labels. In one embodiment, the TD-GAN is trained with cycle segmentation consistency based on a comparison between 1) a reconstructed training image in the second domain and its predicted segmentation labels and 2) a real training image in the second domain and its annotated segmentation labels. The reconstructed training image in the second domain is generated from a synthesized training image in the first domain, which is generated from the real training image in the second domain. Training the TD-GAN is further described below with respect to FIGS. 4A-4F.

At step 306, the one or more anatomical structures are segmented from the synthesized image in the second domain using a trained DI2I network of the TD-GAN. The DI2I network is trained during a prior training stage, as discussed in further detail below with respect to FIG. 5.

Results of the segmentation represent a segmentation of the one or more anatomical structures from the medical image of the patient in the first domain. The results of the segmentation may be of any suitable form. For example, the results of the segmentation may be a segmentation mask (e.g., binary or probability mask) for each of the one or more anatomical structures, annotations associated with the medical image of the patient in the first domain, etc.

At step 308, the results of the segmenting are output. In one embodiment, the results of the segmenting can be output by displaying the results of the segmentation on a display device of a computer system, storing the results of the segmenting on a memory or storage of a computer system, or by transmitting the results of the segmenting to a remote computer system.

FIGS. 4A-4F show functional block diagrams for training the TD-GAN, in accordance with one or more embodiments. The TD-GAN is trained during a training phase. The trained TD-GAN may be applied during an online or testing phase, such as, e.g., in method 300 of FIG. 3. While FIGS. 4A-4F are shown using x-ray images and DRR images, it should be understood that the images may be of any suitable domain.

Figure 4A:
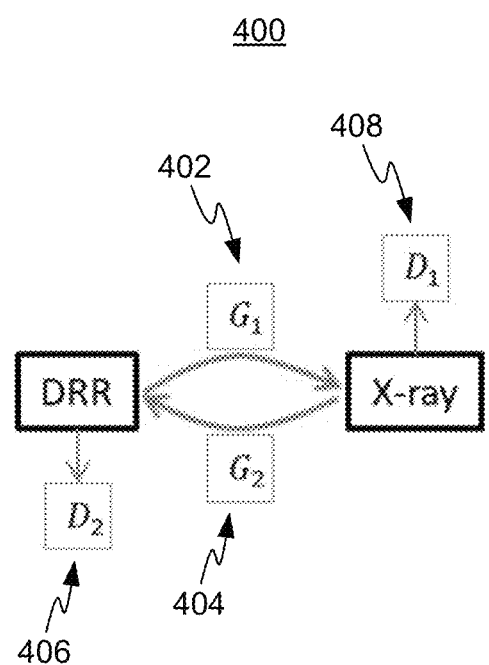
FIG. 4A shows a high-level overview for training a task driven generative adversarial network, in accordance with one or more embodiments.

FIG. 4A shows a high-level overview 400 for training a TD-GAN, in accordance with one or more embodiments.

The TD-GAN comprises a modified Cycle-GAN and a pre-trained DI2I network. The modified Cycle-GAN is modified to add supervision modules to enforce segmentation consistency. Accordingly, the TD-GAN is trained so that x-ray medical images are translated to not only have the appearance of DRR images, but also can be segmented by the pre-trained DI2I network. This is achieved by introducing conditional adversarial training on the translation of real x-ray medical images to generate fake (i.e., synthesized) DRR images and cycle segmentation consistency on the translation of real DRR images to reconstructed DRR images, as discussed in further detail below with respect to FIGS. 4D and 4F, respectively.

The TD-GAN includes generators $G_1$ 402 and $G_2$ 404. Generator $G_1$ 402 is trained to generate fake x-ray images from real DRR images and generator $G_2$ 404 is trained to generated fake DRR images from real x-ray images. Generators $G_1$ 402 and $G_2$ 404 are trained using a set of real x-ray training images and a set of real (i.e., not translated) DRR training images. The x-ray training images are unlabeled while the DRR training images are annotated pixel-wise. The x-ray training images and DRR training images are not paired (i.e., they are not taken from the same group of patients). The x-ray training images are of a region of interest comprising one or more anatomical structures, such as, e.g., lung, heart, liver, and bone (or a subset thereof). The DRR training images are of the same region of interest and are generated by placing 3D labeled CT volumes in a virtual imaging system simulating actual x-ray geometry. The pixel-level labeling of the DRR training images are generated by projecting 3D CT labels along the same trajectories.

Generators $G_1$ 402 and $G_2$ 404 are trained using adversarial loss functions 408 and 406, respectively, denoted as discriminators $D_1$ and $D_2$, respectively. Discriminator $D_1$ 408 aims to distinguish between the fake x-ray image generated by generator $G_1$ 402 and a real x-ray image from the sets of training images, and classifies one image as real and the other as fake. Discriminator $D_2$ 406 aims to distinguish between the fake DRR image generated by generator $G_2$ 404 and a real DRR image from the sets of training images, and classifies one image as real and the other as fake. Adversarial loss functions 408 and 406 will guide generators $G_1$ 402 and $G_2$ 404 to generate fake images that are indistinguishable from the real training images in their corresponding domain.

Generators $G_1$ 402 and $G_2$ 404 are trained with cycle consistency due to the sets of unpaired training images. Cycle consistency encourages cascaded translations provided by generators $G_1$ 402 and $G_2$ 404 to reconstruct the original image.

Figure 4B:
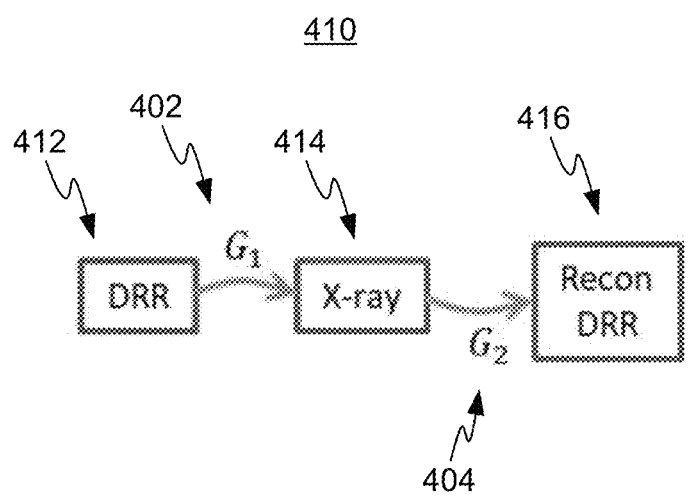
FIG. 4B shows a functional block diagram depicting cycle consistency for reconstructing a digitally reconstructed radiograph image from a real digitally reconstructed radiograph image, in accordance with one or more embodiments.

FIG. 4B shows a functional block diagram 410 depicting cycle consistency for reconstructing a DRR image from a real DRR image, in accordance with one or more embodiments. According to DRR cycle consistency, real DRR image 412 translated to fake x-ray image 414 by $G_1$ 402 which is translated back to a reconstructed (i.e., fake) DRR image 416 by generator $G_2$ 404 should return the initial DRR image 412. As such, the reconstructed DRR image 416 generated by generator $G_2$ 404 (which was generated from the fake x-ray image 414 generated by generator $G_1$ 402, which was generated from a real DRR image 412) is compared with that real DRR image 412 to achieve cycle consistency.

Figure 4C:
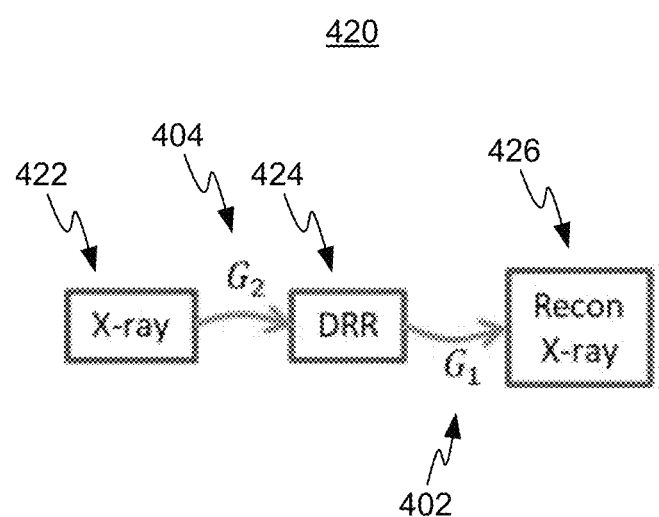
FIG. 4C shows a functional block diagram depicting cycle consistency for reconstructing an x-ray image from a real x-ray image, in accordance with one or more embodiments.

FIG. 4C shows a function block diagram 420 depicting cycle consistency for reconstructing an x-ray image from a real x-ray image, in accordance with one or more embodiments. According to x-ray cycle consistency, an x-ray image 422 translated to fake DRR image 424 by generator $G_2$ 404 which is translated back to a reconstructed (i.e., fake) x-ray image 426 by generator $G_1$ 402 should return the initial x-ray image 422. As such, reconstructed x-ray image 426 generated by generator $G_1$ 402 (which was generated from the fake DRR image 424 generated by generator $G_2$ 404, which was generated from a real x-ray image 422) is compared with that real x-ray image 422 to achieve cycle consistency.

Typically, image translation is only focused on the appearance of the synthesized image and is not concerned with segmentation of structures from the synthesized image. Important prior knowledge, such as, e.g., organ boundaries, shapes, and local variations, are not carefully treated and may possibly be lost during image translation.

Advantageously, the TD-GAN is trained with supervision modules to enforce segmentation consistency. During the translation process, x-ray images are translated so that they not only have the appearance of DRR images, but also so that they can be segmented, e.g., by a trained DI2I network. This is done by introducing conditional adversarial training on the translation of x-ray images and cycle segmentation consistency on the translation of DRR images.

The TD-GAN architecture is trained with four different paths that translate images between two different domains: 1) real DRR→fake x-ray, 2) real x-ray→fake DRR, 3) real x-ray→reconstructed x-ray, and 4) real DRR→reconstructed DRR. The data distribution is denoted herein as $d \sim p_d$ for DRR images and $x \sim p_x$ for x-ray images.

Figure 4D:
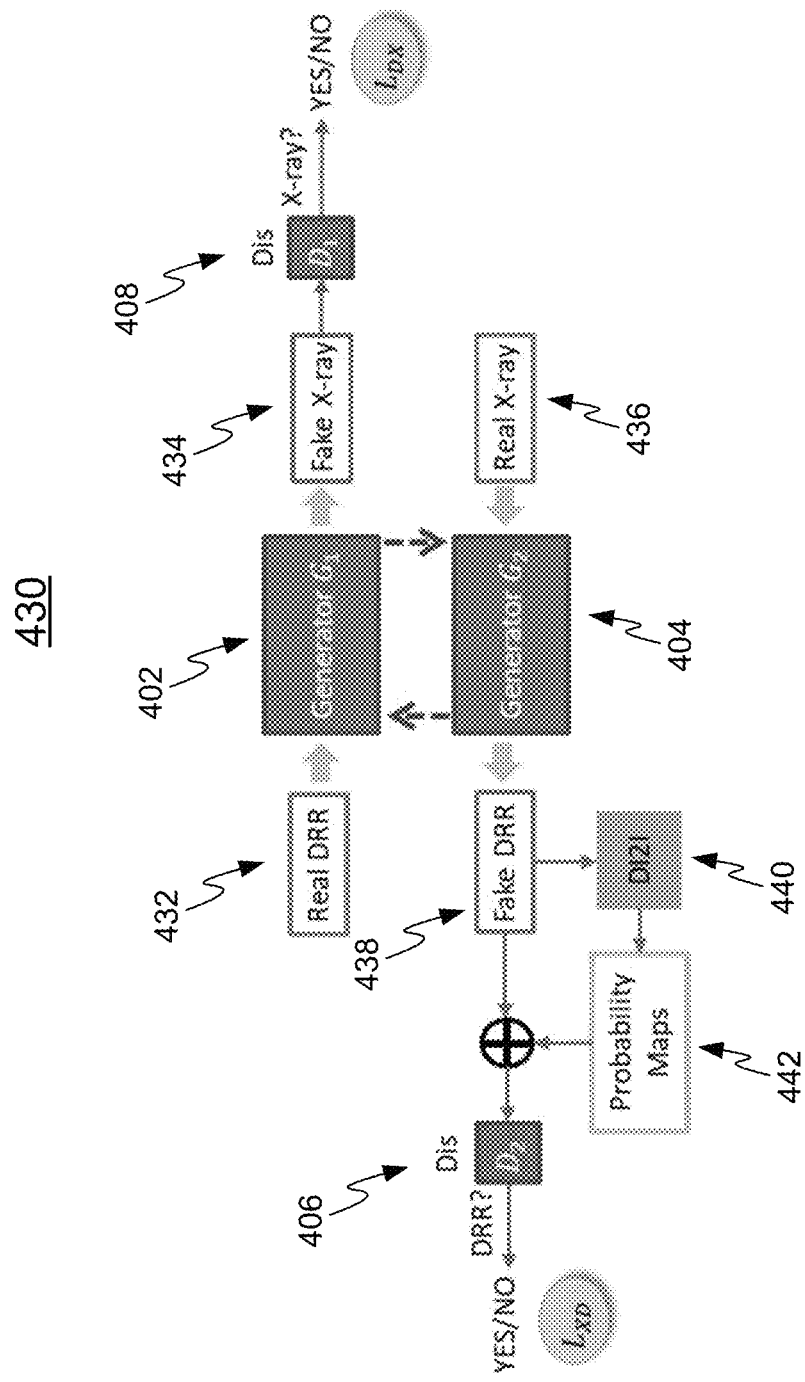
FIG. 4D shows a functional block diagram for training a task driven generative adversarial network for translation of a real digitally reconstructed radiograph image to a fake x-ray image and a real x-ray image to a fake digitally reconstructed radiograph image, in accordance with one or more embodiments.

FIG. 4D shows a functional block diagram 430 for training a TD-GAN for translation of a real DRR image to a fake x-ray image and a real x-ray image to a fake DRR image, in accordance with one or more embodiments.

For the translation of a real DRR image to a fake x-ray image, given a real DRR image 432, generator $G_1$ 402 tries to generate a fake x-ray image 434 in the appearance of an x-ray image and discriminator $D_1$ 408 tries to distinguish the generated fake x-ray image 434 from a real x-ray image. Since the x-ray training images and the DRR training images are unpaired, the real x-ray image may be randomly selected from the training set. A successful generation by generator $G_1$ 402 will confuse discriminator $D_1$ 408 to make the wrong prediction. The loss function $\mathcal{L}_{DX}$ for this path is as follows:

$$\mathcal{L}_{DX} := \mathbb{E}_{x \sim p_x}\{\log [D_1(x)]\} + \mathbb{E}_{d \sim p_d}\{\log [1-D_i(G_i(d))]\} \quad (1)$$

For the translation of a real x-ray image to a fake DRR image, given a real x-ray image 436, generator $G_2$ 404 tries to generate a fake DRR image 438 in the appearance of a DRR image and discriminator $D_2$ 406 tries to distinguish the generated fake DRR image 438 from a real DRR image. While the real DRR image could be randomly selected from the set of training images, this is not optimal since the labels of the DRR training images would not be utilized. The labels of the DRR training images contain anatomical information, such as, e.g., size, shape, and location, that are important for segmentation. A pre-trained DI2I network 440 is leveraged to predict probability maps 442 on the fake DRR image 438. The DI2I network is further described below with respect to FIG. 5. Probability maps 442 represent predicted segmentation masks or labels for fake DRR image 432. Fake DRR image 438 combined with its probability maps 442 are compared with a real training DRR image with its labels by discriminator $D_2$ 406. Therefore, discriminator $D_2$ 406 not only distinguishes between fake DRR image 438 and a real DRR image, but also determines whether the image-label pairs are realistic. To confuse discriminator $D_2$ 406, generator $G_2$ 404 will particularly focus on the anatomical structures of interest during the image translation. To make the involved loss function differentiable, probability maps 442 predicted by DI2I network 440 are not binarized. Denoting $U(\bullet)$ as the trained DI2I network 440, the loss function $\mathcal{L}_{XD}$ for this path is as follows.

$$\mathcal{L}_{XD} := \mathbb{E}_{d \sim p_x}\{\log[D_2(d|U(d))]\} + \mathbb{E}_{x \sim p_x}\{\log[1-D_2(G_2(x))|U(G_2(x))]\} \quad (2)$$

It is noted that the pre-trained DI2I network 440 is frozen during the training of the TD-GAN, otherwise the supervision will be disturbed by the fake DRR images. Furthermore, the TD-GAN can be easily adapted to other tasks by replacing $U(\bullet)$. For example, $U(\bullet)$ can be replaced with other types of supervision networks for computer-aided diagnosis, such as, e.g., prostate lesion classification, anatomical landmark localization, and abnormal motion detection.

Figure 4E:
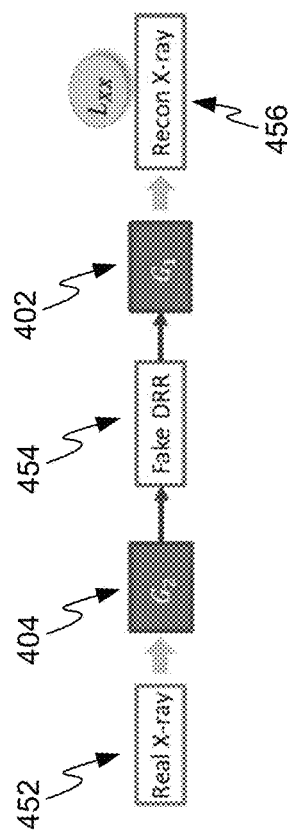
FIG. 4E shows a functional block diagram for training the task driven generative adversarial network for translation of a real x-ray image to a reconstructed x-ray image, in accordance with one or more embodiments.

FIG. 4E shows a functional block diagram 450 for training the TD-GAN for translation of a real x-ray image to a reconstructed x-ray image, in accordance with one or more embodiments. Real x-ray image 452 is translated to fake DRR image 454 via generator $G_2$ 404, which is translated to a reconstructed x-ray image 456 via generator $G_1$ 402. Generators $G_1$ 402 and $G_2$ 404 should be cycle consistent such that reconstructed x-ray image 456 is the same as real x-ray image 452. The loss function $\mathcal{L}_{XX}$ for this path is calculated by $l_1$ distance as follows:

$$\mathcal{L}_{XX} := \mathbb{E}_{x \sim p_x}\{\|G_1(G_2(x))-x\|_1\} \quad (3)$$

Figure 4F:
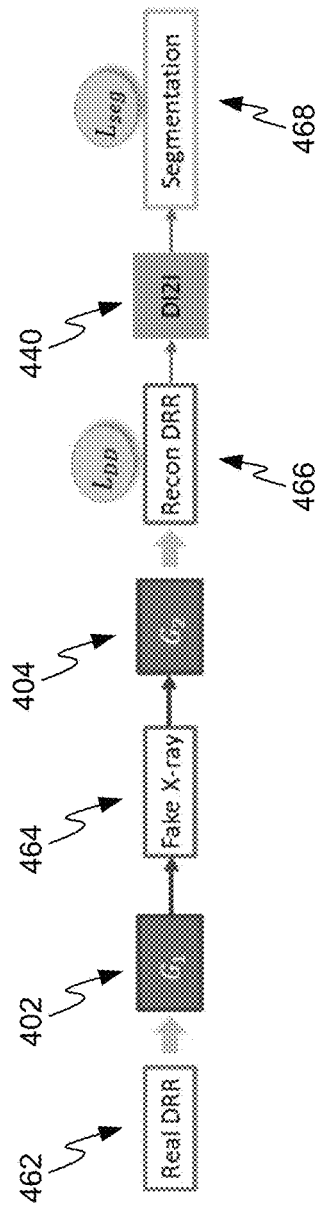
FIG. 4F shows a functional block diagram for training the task driven generative adversarial network for translation of a real digitally reconstructed radiograph image to a reconstructed digitally reconstructed radiograph image, in accordance with one or more embodiments.

FIG. 4F shows a functional block diagram 460 for training the TD-GAN for translation of a real DRR image to a reconstructed DRR image, in accordance with one or more embodiments. Real DRR image 462 is translated to fake x-ray image 464 via generator $G_1$ 402, which is translated to a reconstructed DRR image 466 via generator $G_2$ 404. Generators $G_1$ 402 and $G_2$ 404 should be cycle consistent. Moreover, cycle segmentation consistency is enforced on reconstructed DRR 466 by adding a segmentation loss $\mathcal{L}_{seg}$ as a regularization term by leveraging DI2I network 440 to predict a segmentation 468 from reconstructed DRR image 466. As such, reconstructed DRR image 466 should not only appear similar to real DRR image 462, but also maintain the same segmentation performance. The losses involved in this path are as follows:

$$\mathcal{L}_{DD} := \mathbb{E}_{d \sim p_d}\{\|G_2(G_1(d))-d\|_1\} \quad (4)$$

$$\mathcal{L}_{seg} := \Sigma w_i(y_i \log \mathcal{P}_i + (1-y_i)\log(1-\mathcal{P}_i)) \quad (5)$$

where $y_i$ is the ground truth binary label map for each organ, $w_i$ are weights obtained from numerical experiments on given data with cross-validation, and $\mathcal{P}_i$ is calculated as $\exp(x_i)/(\exp(x_0)+\exp(x_i))$ for i=1, 2, 3, 4. $x_0, x_1, x_2, x_3, x_4$ are returned by DI2I network 44 passing through the reconstructed DRR 466.

A composite loss function is defined in Equation (6) as a weighted summation of the loss functions for each path (i.e., the loss functions of Equations (1)-(5)). The TD-GAN is trained by optimizing the composite loss function of Equation (6):

$$\mathcal{L}_{TD-GAN} := \lambda_1 \mathcal{L}_{DX} + \lambda_2 \mathcal{L}_{XD} + \lambda_3 \mathcal{L}_{XX} + \lambda_4 \mathcal{L}_{DD} + \lambda_5 \mathcal{L}_{seg} \quad (6)$$

where $\lambda'_i$ are scalars obtained from numerical experiments with cross-validation.

Figure 5:
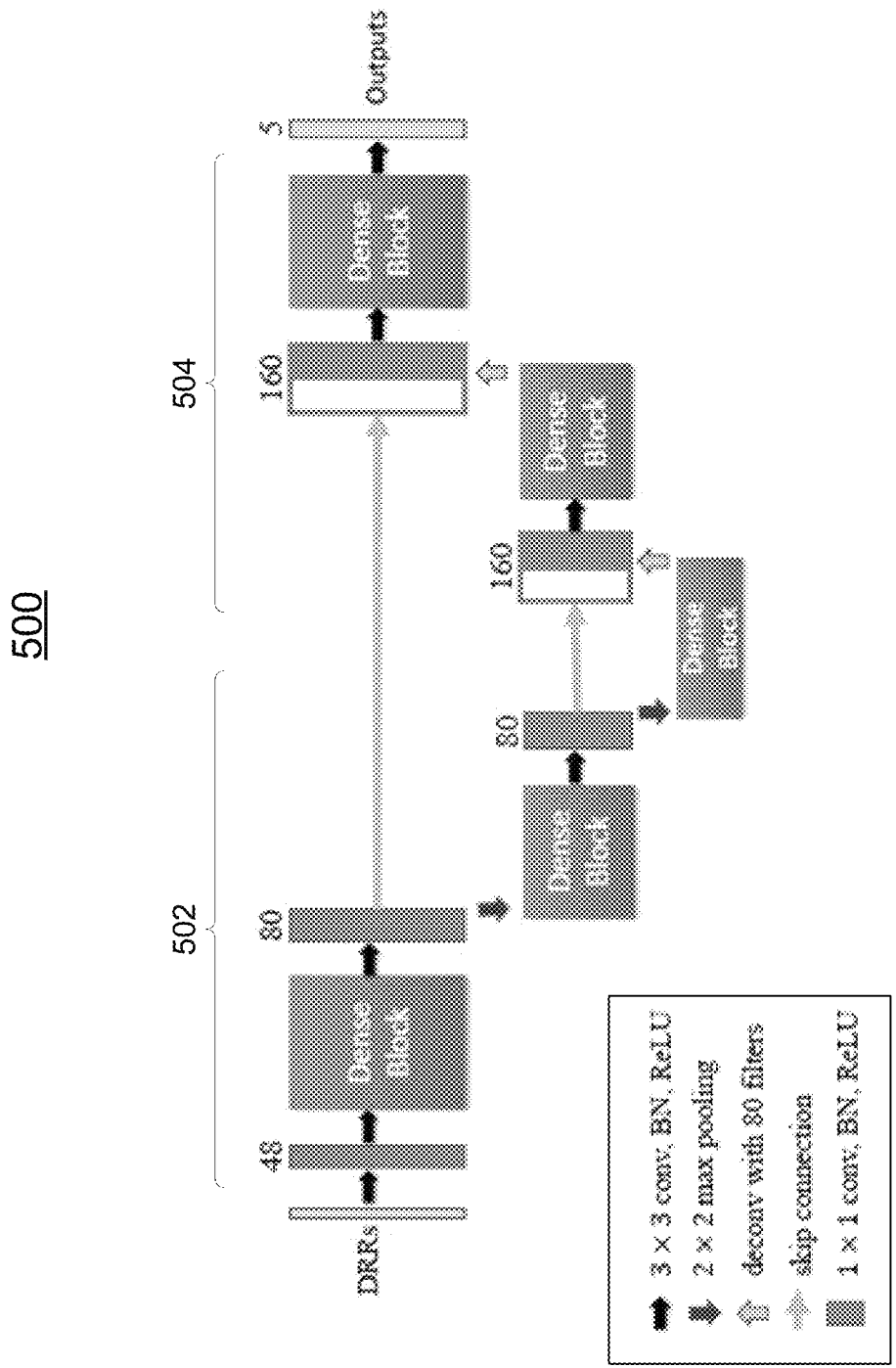
FIG. 5 shows a deep image-to-image network for segmentation of digitally reconstructed radiograph images, in accordance with one or more embodiments.

FIG. 5 shows a DI2I network 500 for segmentation of DRR images, in accordance with one or more embodiments. DI2I network 500 is trained using labeled DRR training images to predict a segmentation of a DRR image.

DRR images are input into DI2I network 500 and segmentation results (e.g., segmentation mask images) are output from DI2I network 500. DI2I network 500 includes an encoding network 502 and a decoding network 504. Encoding network 502 has a series of layers that code or down samples the input image into a code whose size is substantially less than the size of the input image to thereby extract high-level representations or features of the input image. Decoding network 504 has a series of layers that will then decode the code or convert the high-level representations back to a pixel-level semantic representation with pixels associated with anatomical structures to provide an output segmentation mask image. The output segmentation mask image comprises pixels associated with anatomical structures. All the intermediate information generated in encoding network 502 is shared with decoding network 504 so that no information is lost in the encoding process.

The layers of encoding network 502 and decoding network 504 are formed of dense blocks, which are generalizations from ResNets by iteratively concatenating all feature outputs in a fee-forward fashion. This helps to alleviate the vanishing gradient problem, allowing a deeper model with higher level feature extraction. The final output segmentation mask image comprises five channels: a background channel $x_0$ and four channels $x_1$, $x_2$, $x_3$, $x_4$ each corresponding to anatomical structures (e.g., lung, heart, liver, bone) segmented from the input image. Accordingly, the challenge of segmenting overlapped organs is alleviated and the problem is simplified into a binary classification. The loss function $\mathcal{L}_{seg}$ in Equation (5) is used, which is a weighted combination of binary cross entropies between each organ channel and background channel.

Figure 6:
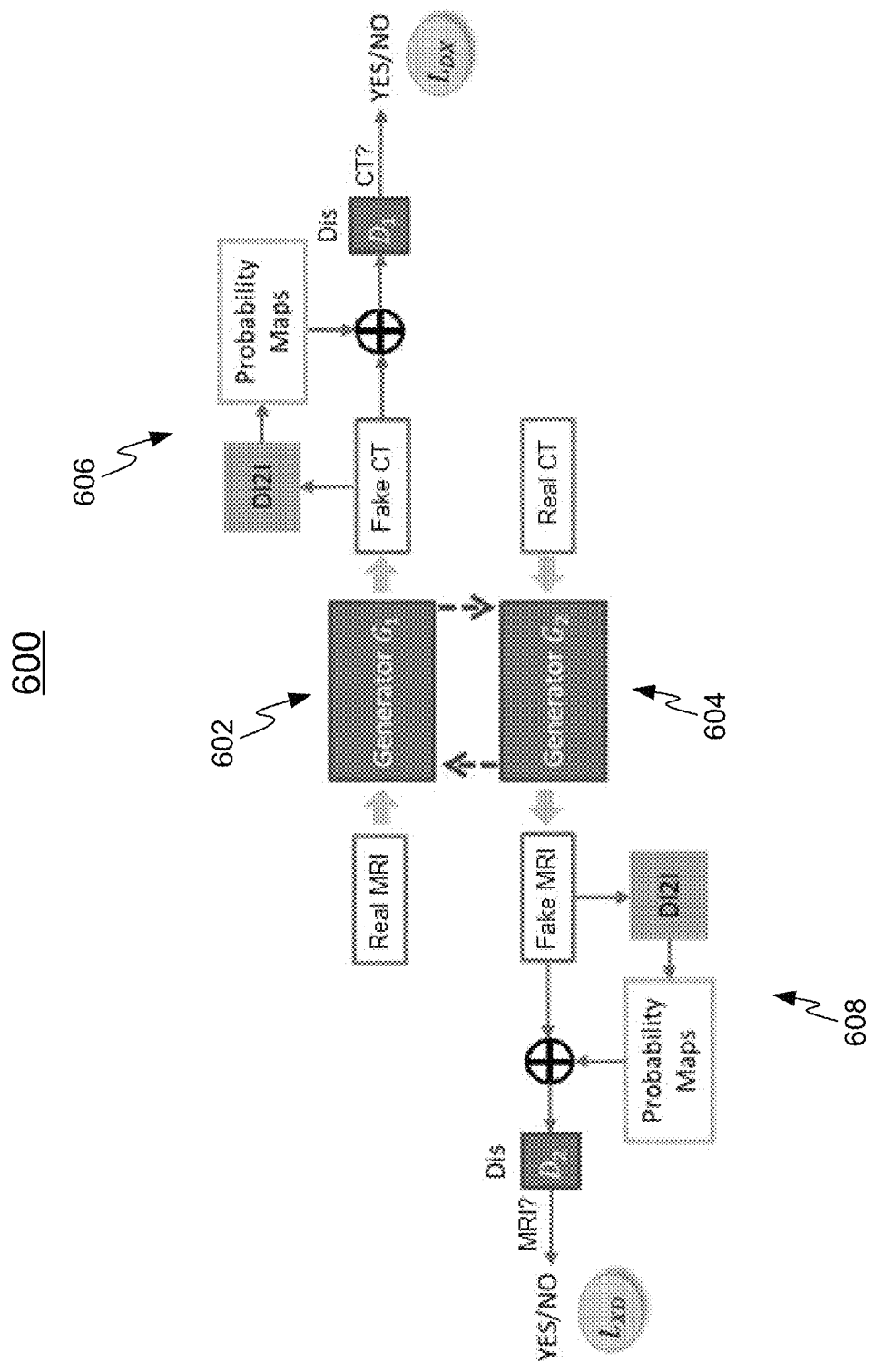
FIG. 6 shows a functional block diagram for training a modified task driven generative adversarial network for dual segmentation supervision, in accordance with one or more embodiments.

In one embodiment, the TD-GAN, trained as described above with respect to FIGS. 4A-4F, may be modified for dual segmentation supervision. FIG. 6 shows a functional block diagram 600 for training a modified TD-GAN for dual segmentation supervision, in accordance with one embodiment. The modified TD-GAN includes generator $G_1$ 602 trained to generate a fake CT image from a real MRI image and generator $G_2$ 604 trained to generate a fake MRI image from a real CT image. While generators $G_1$ 602 and $G_2$ 604 are described in FIG. 6 with respect to MRI images and CT images, it should be understood that images of any suitable domain may be applied. The modified TD-GAN is similarly trained as described above with respect to FIGS. 4A-4F for the TD-GAN, however the modified TD-GAN adds a second segmentation supervision module 606 in addition to the first segmentation supervision module 608. Segmentation supervision modules 606 and 608 enforce segmentation consistency for both generators $G_1$ 602 and $G_2$ 604, respectively.

In accordance with one embodiment, the modified TD-GAN can be utilized to augment sets of training images with limited annotations. Often times, annotations for training images are limited to only a subset of the anatomy. For example, a set of MRI training images may be annotated for certain anatomical structures (e.g., heart and kidney) and a set of CT training images may be annotated for certain other (i.e., different, at least in part) anatomical structures (e.g., lung and liver). Accordingly, a DI2I network may be trained using the set of MRI training images to segment the heart and kidney from MRI images, but not the lung and liver. Similarly, a DI2I network may be trained using the set of CT training images to segment the lung and liver from CT images, but not the heart and kidney. The modified TD-GAN may be applied to augment the sets of training images with limited annotations.

To augment sets of training images with limited annotations, a first DI2I network is trained using the set of real MRI training images to segment the heart and kidney from MRI images and a second DI2I network is trained using the set of real CT training images to segment the lung and liver from CT images. The DI2I networks may be trained as described above with respect to FIG. 5. Next, a modified TD-GAN is trained using the trained first DI2I network and the trained second DI2I network. For example, the trained first DI2I network may be used by first segmentation supervision module 608 and the trained second DI2I network may be used by second segmentation supervision module 606.

During an online stage, generators $G_1$ 602 and $G_2$ 604 of the trained modified TD-GAN may be applied. Generator $G_1$ 602 translates the set of annotated real MRI training images to annotated fake CT training images and generator $G_2$ 604 translates the set of annotated real CT training images to annotated fake MRI training images. Accordingly, a DI2I network may be trained for full organ segmentation (e.g., lung, liver, heart, and kidney) of CT images using an augmented set of training images comprising: the set of real CT training images annotated for the lung and liver and the set of fake CT training images (translated by generator $G_1$ 602) annotated for the heart and kidney. Similarly, a DI2I network may be trained for full organ segmentation (e.g., lung, liver, heart, and kidney) of MRI images using an augmented set of training images comprising: the set of real MRI training images annotated for the heart and kidney and the set of fake MRI training images (translated by generator $G_2$ 604) annotated for the lungs and liver. Advantageously, the modified TD-GAN enables augmented training images.

Embodiments of the present invention were experimentally validated. A TD-GAN, trained as described above with respect to FIGS. 4A-4F and applied as described above with respect to method 300 of FIG. 3, was compared with other methodologies. The TD-GAN utilized generators $G_1$ and $G_2$ with a Resnet20 structure. Discriminators $D_1$ and $D_2$ comprise four consecutive convolutional layers with an increasing number of filters, from 64 to 512, and a final output layer with sigmoid activation.

The experiment was performed using a dataset of 815 labeled DRR images and 153 topograms. The topograms were acquired before the CT scan for isocentering and therefore were co-registered with the CT scans. The CT scans are labeled pixel-wisely and the labels of the topograms are generated by projecting the CT labels.

A DI2I network was trained for multi-organ segmentation on labeled DRR images. A standard 5 fold cross-validation scheme is used to find the best learned weights. The dice score is evaluated on the testing dataset, summarized as follows (mean±standard deviation): lung 0.9417±0.017, heart 0.923±0.056, liver 0.894±0.061, and bone 0.910±0.020. Next, the trained DI2I network is loaded into the TD-GAN with weights frozen, and the TD-GAN was trained to segment the topograms. All DRR images and 73 topograms were used for training, 20 topograms for validation, and 60 topograms for testing.

Figure 7:
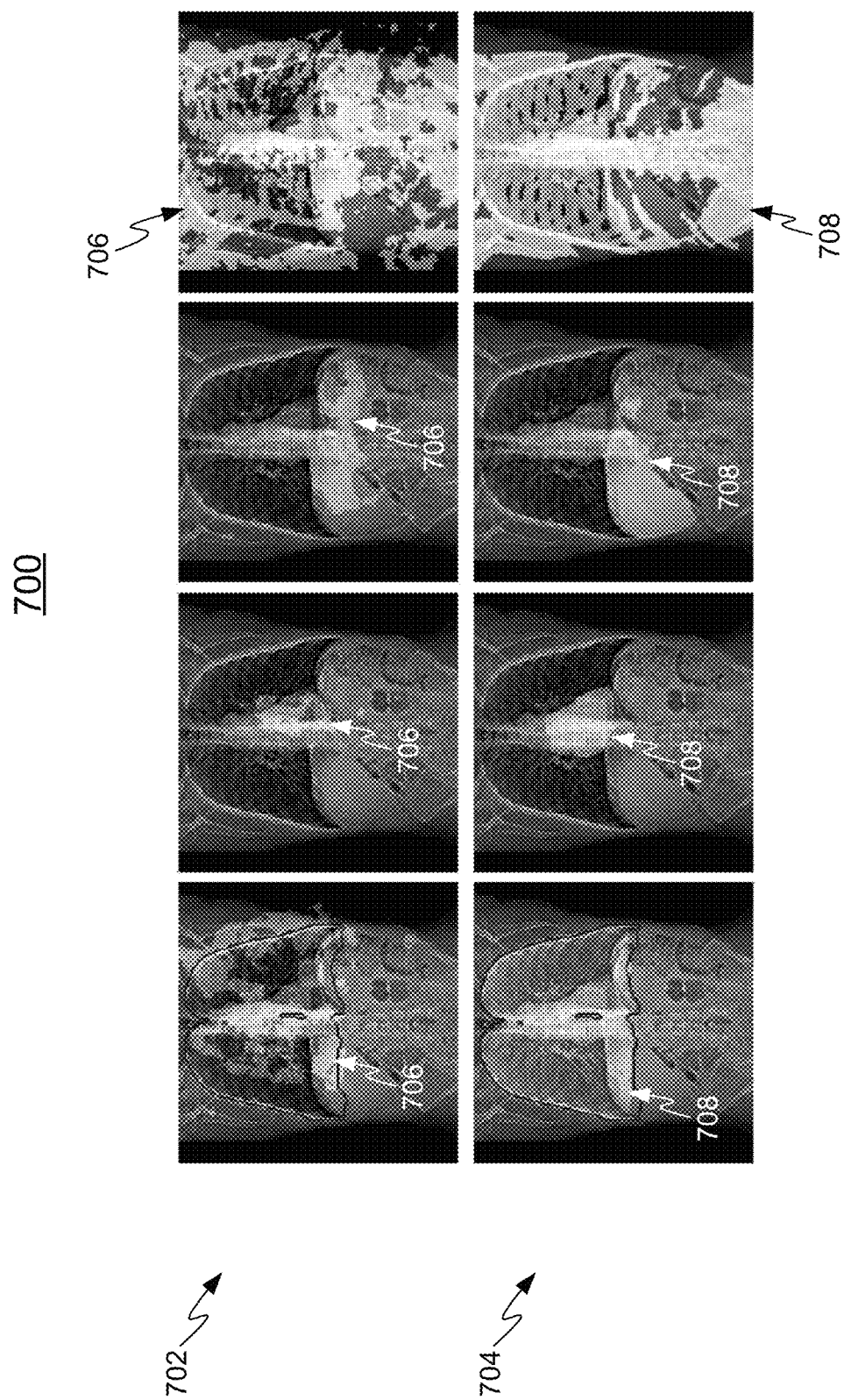
FIG. 7 shows a comparison of segmentation results, in accordance with one or more embodiments.

FIG. 7 shows a comparison 700 of segmentation results of a trained DI2I network in top row 702 and segmentation results of a TD-GAN, trained in accordance with embodiments of the present invention, in bottom row 704. Highlighted portions 706 show predicted segmentation results of the trained DI2I network and highlighted portions 708 show predicted segmentation results of the trained TD-GAN.

Table 8 shows a table 800 of numerical results of the trained TD-GAN compared with: a DI2I with vanilla settings, Cycle-GAN (CGAN), TD-GAN adversarial (TD- GAN-A), TD-GAN reconstruction segmentation (TD-GAN-S), and a supervised DI2I network. TD-GAN-A and TD-GAN-S represent the TD-GAN with only the conditional adversarial loss and only the cycle segmentation consistency loss enabled, respectively. The DI2I network with vanilla settings is tested directly on topograms. The supervised DI2I network was trained on topograms using their labels. Table 800 shows the average Dice results of segmentation on topograms.

While the direct application of the trained DI2I network fails completely, it can be seen that segmentation results of the TD-GAN significantly improved the segmentation accuracy and even provided the same level of accuracy compared with the supervised training with labeled topograms. Compared with Cycle-GAN, which only performs image style translation, both the partially driven networks, TD-GAN-A and TD-GAN-S, can improve the performance. Furthermore, the final TD-GAN combines the advantages of Cycle-GAN, TD-GAN-A, and TD-GAN-S and achieves the best results.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 3. Certain steps or functions of the methods and workflows described herein, including one or more of the steps or functions of FIG. 3, may be performed by a server or by another processor in a network-based cloud-computing system. Certain steps or functions of the methods and workflows described herein, including one or more of the steps of FIG. 3, may be performed by a client computer in a network-based cloud computing system. The steps or functions of the methods and workflows described herein, including one or more of the steps of FIG. 3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
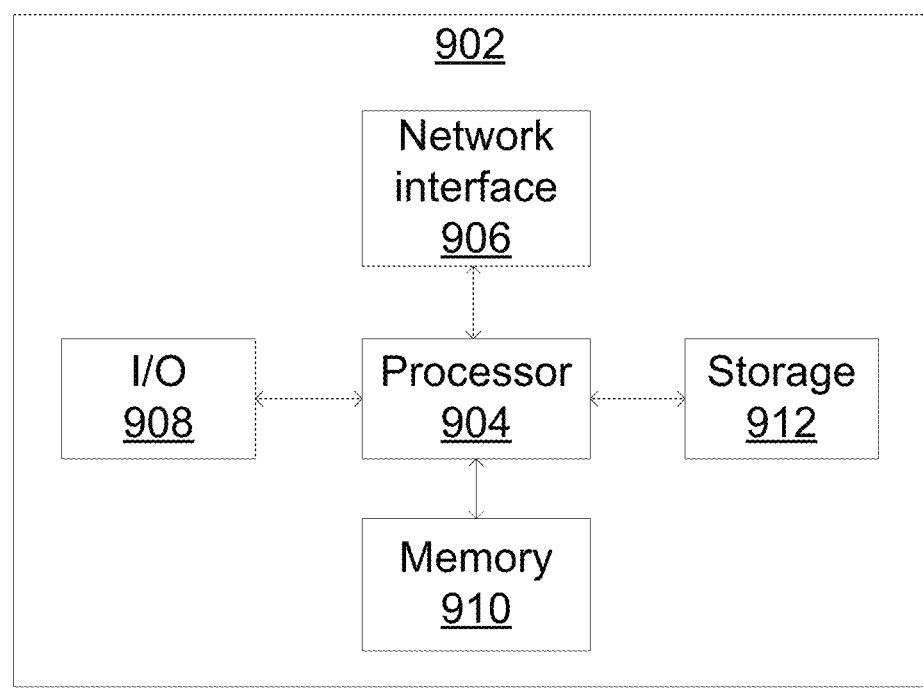
FIG. 9 shows a high-level block diagram of a computer.

A high-level block diagram of an example computer 902 that may be used to implement systems, apparatus, and methods described herein is depicted in FIG. 9. Computer 902 includes a processor 904 operatively coupled to a data storage device 912 and a memory 910. Processor 904 controls the overall operation of computer 902 by executing computer program instructions that define such operations. The computer program instructions may be stored in data storage device 912, or other computer readable medium, and loaded into memory 910 when execution of the computer program instructions is desired. Thus, the steps or functions of FIG. 3 can be defined by the computer program instructions stored in memory 910 and/or data storage device 912 and controlled by processor 904 executing the computer program instructions. For example, the computer program instructions can be implemented as computer executable code programmed by one skilled in the art to perform the steps or functions of FIG. 3. Accordingly, by executing the computer program instructions, the processor 904 executes the steps or functions of FIG. 3. Computer 904 may also include one or more network interfaces 906 for communicating with other devices via a network. Computer 902 may also include one or more input/output devices 908 that enable user interaction with computer 902 (e.g., display, keyboard, mouse, speakers, buttons, etc.).

Processor 904 may include both general and special purpose microprocessors, and may be the sole processor or one of multiple processors of computer 902. Processor 904 may include one or more central processing units (CPUs), for example. Processor 904, data storage device 912, and/or memory 910 may include, be supplemented by, or incorporated in, one or more application-specific integrated circuits (ASICs) and/or one or more field programmable gate arrays (FPGAs).

Data storage device 912 and memory 910 each include a tangible non-transitory computer readable storage medium. Data storage device 912, and memory 910, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 908 may include peripherals, such as a printer, scanner, display screen, etc. For example, input/output devices 908 may include a display device such as a cathode ray tube (CRT) or liquid crystal display (LCD) monitor for displaying information to the user, a keyboard, and a pointing device such as a mouse or a trackball by which the user can provide input to computer 902.

Any or all of the systems and apparatus discussed herein, including elements of workstation 102 of FIG. 1, may be implemented using one or more computers such as computer 902.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for medical image segmentation, comprising:
   receiving a medical image of a patient in a first domain, the medical image comprising one or more anatomical structures;
   generating a synthesized image in a second domain from the medical image of the patient in the first domain using a generator of a task driven generative adversarial network; and
   segmenting the one or more anatomical structures from the synthesized image in the second domain using a trained dense image-to-image network of the task driven generative adversarial network, wherein results of the segmenting of the one or more anatomical structures from the synthesized image in the second domain represent a segmentation of the one or more anatomical structures in the medical image of the patient in the first domain,
   wherein the generator of the task driven generative adversarial network is trained based on predicted segmentation labels of a reconstructed training image in the second domain and annotated segmentation labels of a real training image in the second domain, wherein the reconstructed training image in the second domain is generated from a synthesized training image in the first domain, which is generated from the real training image in the second domain.

2. The method of claim 1, further comprising:
   training the generator of the task driven generative adversarial network based on a comparison between 1) a synthesized training image in the second domain and its predicted segmentation labels and 2) a second real training image in the second domain and its annotated segmentation labels, wherein the synthesized training image in the second domain is generated by the generator from a real training image in the first domain.

3. The method of claim 2, further comprising:
   determining the predicted segmentation labels of the synthesized training image in the second domain using the trained dense image-to-image network.

4. The method of claim 1, further comprising: determining the predicted segmentation labels of the reconstructed training image in the second domain using the trained dense image-to-image network.

5. The method of claim 1, further comprising:
   training the task driven generative adversarial network using unlabeled training images in the first domain and labeled training images in the second domain.

6. The method of claim 1, wherein the trained dense image-to-image network is trained to segment the one or more anatomical structures from the synthesized image in the second domain using labeled training images in the second domain, without training images in the first domain.

7. The method of claim 2, wherein training the generator of the task driven generative adversarial network is further based on:
   a comparison between 1) a second synthesized training image in the first domain and its predicted segmentation labels and 2) a real training image in the first domain and its annotated segmentation labels, wherein the second synthesized training image in the first domain is generated by another generator of the task driven generative adversarial network from the second real training image in the second domain.

8. The method of claim 1, wherein the medical image of the patient in the first domain is an x-ray medical image and the synthesized image in the second domain is a digitally reconstructed radiograph image.

9. An apparatus for medical image segmentation, comprising:
   means for receiving a medical image of a patient in a first domain, the medical image comprising one or more anatomical structures;
   means for generating a synthesized image in a second domain from the medical image of the patient in the first domain using a generator of a task driven generative adversarial network; and
   means for segmenting the one or more anatomical structures from the synthesized image in the second domain using a dense image-to-image network of the task driven generative adversarial network, wherein results of the segmenting of the one or more anatomical structures from the synthesized image in the second domain represent a segmentation of the one or more anatomical structures in the medical image of the patient in the first domain.

10. The apparatus of claim 9, further comprising:
    means for training the generator of the task driven generative adversarial network based on a comparison between 1) a synthesized training image in the second domain and its predicted segmentation labels and 2) a real training image in the second domain and its annotated segmentation labels, wherein the synthesized training image in the second domain is generated by the generator from a real training image in the first domain.

11. The apparatus of claim 10, further comprising:
    means for determining the predicted segmentation labels of the synthesized training image in the second domain using the dense image-to-image network.

12. The apparatus of claim 9, further comprising:
means for training the generator of the task driven generative adversarial network based on predicted segmentation labels of a reconstructed training image in the second domain and annotated segmentation labels of a real training image in the second domain, wherein the reconstructed training image in the second domain is generated from a synthesized training image in the first domain, which is generated from the real training image in the second domain.

13. The apparatus of claim 12, further comprising:
means for determining the predicted segmentation labels of the reconstructed training image in the second domain using the dense image-to-image network.

14. A non-transitory computer readable medium storing computer program instructions for medical image segmentation, the computer program instructions when executed by a processor cause the processor to perform operations comprising:
receiving a medical image of a patient in a first domain, the medical image comprising one or more anatomical structures;
generating a synthesized image in a second domain from the medical image of the patient in the first domain using a generator of a task driven generative adversarial network; and
segmenting the one or more anatomical structures from the synthesized image in the second domain using a trained dense image-to-image network of the task driven generative adversarial network, wherein results of the segmenting of the one or more anatomical structures from the synthesized image in the second domain represent a segmentation of the one or more anatomical structures in the medical image of the patient in the first domain,
wherein the generator of the task driven generative adversarial network is trained based on predicted segmentation labels of a reconstructed training image in the second domain and annotated segmentation labels of a real training image in the second domain, wherein the reconstructed training image in the second domain is generated from a synthesized training image in the first domain, which is generated from the real training image in the second domain.

15. The non-transitory computer readable medium of claim 14, the operations further comprising:
training the generator of the task driven generative adversarial network based on a comparison between 1) a synthesized training image in the second domain and its predicted segmentation labels and 2) a second real training image in the second domain and its annotated segmentation labels, wherein the synthesized training image in the second domain is generated by the generator from a real training image in the first domain.

16. The non-transitory computer readable medium of claim 14, the operations further comprising:
training the task driven generative adversarial network using unlabeled training images in the first domain and labeled training images in the second domain.

17. The non-transitory computer readable medium of claim 14, wherein the trained dense image-to-image network is trained to segment the one or more anatomical structures from the synthesized image in the second domain using labeled training images in the second domain, without training images in the first domain.

18. The non-transitory computer readable medium of claim 15, wherein training the generator of the task driven generative adversarial network is further based on: a comparison between 1) a second synthesized training image in the first domain and its predicted segmentation labels and 2) a real training image in the first domain and its annotated segmentation labels, wherein the second synthesized training image in the first domain is generated by the second generator of the task driven generative adversarial network from another real training image in the second domain.

19. The non-transitory computer readable medium of claim 14, wherein the medical image of the patient in the first domain is an x-ray medical image and the synthesized image in the second domain is a digitally reconstructed radiograph image.

* * * * *